(12) United States Patent
Barnicki

(10) Patent No.: US 7,736,403 B2
(45) Date of Patent: Jun. 15, 2010

(54) PROCESS FOR HUMIDIFYING SYNTHESIS GAS

(75) Inventor: Scott Donald Barnicki, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 12/360,125

(22) Filed: Jan. 27, 2009

(65) Prior Publication Data

US 2009/0126273 A1 May 21, 2009

Related U.S. Application Data

(62) Division of application No. 11/311,762, filed on Dec. 19, 2005, now Pat. No. 7,503,947.

(51) Int. Cl.
| | |
|---|---|
| C01B 3/36 | (2006.01) |
| C10J 3/46 | (2006.01) |
| C10J 3/54 | (2006.01) |
| B01J 7/00 | (2006.01) |
| H01M 8/06 | (2006.01) |
| F02B 43/00 | (2006.01) |
| F02G 3/00 | (2006.01) |
| F02C 6/18 | (2006.01) |
| B01D 47/06 | (2006.01) |

(52) U.S. Cl. .................. 48/197 R; 48/61; 60/39.12; 60/780; 261/128

(58) Field of Classification Search ............ 48/61; 60/39.12, 780; 261/128
See application file for complete search history.

(56) References Cited

U.S. PATENT DOCUMENTS

| 4,110,359 | A | * | 8/1978 | Marion ................. 518/703 |
| 4,946,477 | A | * | 8/1990 | Perka et al. ............ 48/197 R |
| 2003/0131582 | A1 | * | 7/2003 | Anderson et al. ......... 60/39.55 |
| 2003/0162846 | A1 | * | 8/2003 | Wang et al. ............. 518/703 |
| 2003/0191196 | A1 | * | 10/2003 | Madhubhai et al. ........ 518/704 |
| 2003/0192235 | A1 | * | 10/2003 | French et al. ............ 44/572 |
| 2004/0034111 | A1 | * | 2/2004 | Tonkovich et al. ......... 518/726 |

FOREIGN PATENT DOCUMENTS

EP 0092856 A2 * 11/1983

* cited by examiner

*Primary Examiner*—Alexa D Neckel
*Assistant Examiner*—Matthew J Merkling
(74) *Attorney, Agent, or Firm*—Eric D. Middlemas; Bernard J. Graves, Jr.

(57) ABSTRACT

Disclosed is a process for humidifying syngas to achieve a water to carbon monoxide molar ratio in the product syngas within a desired range and in which the molar ratio which can be varied over time in response to changes in downstream syngas requirements. The raw syngas is produced by reacting a carbonaceous material with oxygen, water, or carbon dioxide and can be combined with a diluent to produce a diluted syngas stream which can be cooled and contacted with liquid water to give a humidified syngas. The $H_2O:CO$ molar ratio of the humidified syngas may be adjusted in response to time-varying downstream syngas requirements by changing the amount and/or temperature of the diluent that is combined with the raw syngas stream, by adjusting quench and heat exchange conditions, or a combination thereof. The application of the process to the coproduction of chemicals and power are also disclosed.

21 Claims, 1 Drawing Sheet

PROCESS FOR HUMIDIFYING SYNTHESIS GAS

CROSS REFERENCES TO RELATED APPLICATIONS

This application is a divisional application of U.S. application Ser. No. 11/311,762, filed Dec. 19, 2005.

FIELD OF THE INVENTION

This invention relates to the production of synthesis gas by partial oxidation of carbonaceous materials. More particularly, this invention relates to a process for humidifying synthesis gas produced by the gasification of a carbonaceous material to achieve a water to carbon monoxide molar ratio within a desired range. The $H_2O:CO$ molar ratio can be varied over time in response to one or more downstream syngas requirements.

BACKGROUND OF THE INVENTION

The high price and diminishing supply of natural gas and petroleum has caused the chemical and power industry to seek alternative feedstocks and fuels for the production of chemicals and the generation of electrical power. By contrast, coal and other carbonaceous fuels such as, for example, petroleum coke, petroleum wastes, biomass, and paper pulping wastes, are in great abundance, relatively inexpensive, and are logical materials for the art to investigate as alternative feedstock sources. Coal and other solid carbonaceous materials can be gasified, i.e., partially combusted with oxygen, to produce synthesis gas (also referred to as hereinafter as "syngas"), which can be cleaned and used to produce a variety of chemicals or burned to generate power.

Gasification processes typically produce a crude synthesis gas with a molar ratio of $H_2$ to CO of about 0.3:1 to 1.5:1, together with lesser amounts of $CO_2$, $H_2S$, water vapor, methane, and other materials. The molar ratio of $H_2$ to CO in the product syngas is highly dependent on the feedstock and gasification process used therein, but generally falls within the above range. Different applications, however, require different $H_2$ to CO molar ratios to utilize the syngas raw material efficiently. For example, Fischer-Tropsch and methanol reaction stoichiometries require a molar ratio of $H_2$:CO of about 2:1, synthetic natural gas production requires about 3:1, acetic acid synthesis requires about 1:1, while the feedstocks for ammonia or hydrogen production require only the hydrogen component of syngas. This molar ratio can be adjusted by methods known in the art such as, for example, by the water gas shift reaction in which carbon monoxide is reacted with water to produce hydrogen and carbon dioxide.

The molar ratio of water to carbon monoxide of the syngas feed is an important parameter for proper operation of the water gas shift reaction section. A high $H_2O:CO$ molar ratio, typically about 1.5:1 to about 3:1, is advantageous to help control the temperature increase from the exothermic heat of reaction and to limit side reactions such as methanation. The $H_2O:CO$ molar ratio present in the syngas is dependent both on its method of production and on the operating parameters for that particular method. In addition, when syngas is used as a fuel for power plants, the presence of water in the syngas is sometimes desirable to retard fouling of the combustion turbine and other equipment.

For example, the amount of water present in a raw syngas produced by gasification is in part dependent on the feed method to the gasifier (e.g., water slurry or dry feed of the carbonaceous feedstock), the gasifier type, operating conditions, and the method used to cool the raw syngas from a gasification process. Often in water slurry-fed gasifiers, there is insufficient water in the cooled syngas effluent from the gasifier to operate a water gas shift reaction at the desired conversion. With dry coal feed gasifiers, the water content in the raw syngas is even lower than with a water slurry feed method. Thus, a method of humidifying syngas is needed that will provide an wide range of $H_2O:CO$ molar ratios for a water gas shift reaction.

In addition to adequate humidification, it is also desirable to recover thermal energy efficiently from the raw syngas while retaining the ability to control the amount of water present. Many methods have been proposed in the art for cooling raw synthesis gas, including full water quenching, diluent gas cooling, and radiant cooling. In a full water quench design such as, for example, as disclosed in U.S. Pat. No. 2,896,927, the hot raw syngas from the partial oxidation section is immediately contacted with a reservoir of flowing water without intermediate heat exchange. The raw syngas is rapidly cooled by direct contact heat exchange and a fraction of the sensible heat content of the syngas heats and evaporates quench water. The quenched outlet syngas typically is saturated with water to its equilibrium level and has a $H_2O:CO$ molar ratio approximately in the range of about 1.5 to about 2.7:1 and an outlet gas temperature of around 185 to about 245° C., depending on system pressure. Although capable of providing a humidified syngas, the above full quench design is energy inefficient. Because of the high temperature of the raw syngas, the thermal energy of the raw syngas is degraded to a much lower temperature range and is incapable of generating valuable high pressure steam. Moreover, the ability to precisely adjust the $H_2O:CO$ molar ratio is severely limited.

In radiant cooling designs such as, for example, as described in U.S. Pat. No. 4,889,657 and in C. Higman and M. van der Burgt "*Gasification*" (Elsevier, 2003), Chapter 5, Section 5.3.5, the hot crude syngas leaves the partial oxidation section of an entrained-flow gasifier and enters a heat exchanger section that relies on a radiant heat transfer system to generate steam in tubes built into the heat transfer surface at the perimeter of a cylindrical gas flow area. Gas typically leaves the radiant cooler section at a temperature less than about 800° C. Radiant cooling processes, therefore, enhance the energy efficiency of the gasification process by generating steam from the sensible heat of the raw syngas, but do not address the humidification of the cooled syngas.

Cooling the raw syngas in a radiant cooling section followed by total quench cooling also has been described, for example in EPRI report AP-3486, "*Cost and Performance for Commercial Applications of Texaco-Based Gasification-Combined-Cycle Plants*", Volume 1, Final Report Project 2029-10, April 1984. Other combinations of radiant and quench cooling have been disclosed, for example, in U.S. Pat. Nos. 4,502,869 and 4,559,061, in which a fraction of the raw syngas is passed to a water quench section and a remaining fraction is passed to a radiant cooling section. Another example of a gas cooling design is described in C. Higman and M. van der Burgt "*Gasification*" (Elsevier, 2003), Chapter 5, Section 5.3.3. In this design the raw syngas leaves the partial oxidation section at a temperature of about 1200 to 1500° C. of an entrained-flow gasifier and is mixed with previously cooled, recycled gas at about 280° C. in sufficient quantity to cool the mixture to about 700 to 900° C. The mixed gas is then further cooled by generating steam in a convective syngas heat exchanger to about 280° C.

The various humidification and cooling methods disclosed in the art do not address the problem of producing a humidified syngas having a broad range of $H_2O:CO$ molar ratios that can be varied in response to multiple downstream syngas requirements while, at the same time, efficiently recovering the thermal energy of the syngas stream. Therefore, a simple, reliable, and energy efficient method for humidifying a syngas stream that is capable of producing a full range of $H_2O:CO$ molar ratios is needed. In addition, there is need for a process in which the $H_2O:CO$ molar ratio of a syngas stream can be precisely controlled and varied over time as required for one or more downstream applications.

SUMMARY OF THE INVENTION

I have discovered by careful calculation that syngas produced by the partial oxidation of a carbonaceous material can be humidified and the water to carbon monoxide ratio of the humidified syngas precisely controlled to a target value. Further, the $H_2O:CO$ ratio of the humidified syngas can be readily varied over time in response to one or more downstream syngas requirements, and the remaining thermal energy that is not used for humidification can be efficiently recovered. Accordingly, a process for humidifying syngas is set forth comprising:
(a) reacting a carbonaceous material with oxygen, water, or carbon dioxide to produce a raw syngas stream comprising hydrogen, carbon monoxide, and carbon dioxide;
(b) combining the raw syngas stream of step (a) with a diluent to produce a diluted syngas stream;
(c) passing the diluted syngas stream of step (b) to a heat exchanger to produce a cooled syngas stream; and
(d) contacting the cooled syngas stream of step (c) with liquid water to produce a humidified syngas stream having a $H_2O:CO$ molar ratio of about 0.2:1 to about 4:1.

The hot, raw syngas can be combined with a diluent and subjected to cooling heat exchange and quenching operations to retain sufficient sensible heat to vaporize a fraction of the quench water to satisfy a target $H_2O:CO$ molar ratio. The $H_2O:CO$ molar ratio can be adjusted by varying the flow rate and temperature of a diluent stream mixed with the raw syngas prior to the cooling heat exchange operation. By combining the raw syngas stream with a diluent prior to passing the stream to a heat exchanger, less sensible heat is recovered from the syngas stream and more water is vaporized upon contacting the cooled syngas stream with water. The diluent may comprise a variety of gaseous substances such as, for example, water, steam, recycled syngas, nitrogen, natural gas, methane, ethane, propane, butane, argon, helium, carbon dioxide, waste gases, combustion stack gases, or combinations thereof. The water to carbon monoxide molar ratio also can be controlled by varying the pressure of the steam generated from a portion of the sensible heat of the raw synthesis gas. The process of the invention enables humidification of a syngas stream and the efficient recovery of heat energy that is not used for humidification.

The present invention also provides a method to efficiently and quickly vary the water to carbon monoxide molar ratio of a syngas stream to satisfy multiple downstream needs for syngas such as, for example, a chemical process and a power producing process, which may have different water:carbon monoxide molar ratio requirements. My invention thus further comprises adjusting the $H_2O:CO$ molar ratio of the humidified syngas in response to time-varying downstream syngas requirements by changing the flow rate and/or temperature of the diluent stream. For example, the downstream syngas requirement can be a demand for syngas as feedstock for a chemical process or as fuel for a combustion turbine in a power plant. Thus, another embodiment of the invention is a process for the coproduction of power and chemicals, comprising:
(a) reacting a carbonaceous material with an oxidant stream in a gasifier to produce a raw syngas stream comprising hydrogen, carbon monoxide, and carbon dioxide;
(b) combining the raw syngas stream of step (a) with a diluent to produce a diluted syngas stream;
(c) passing the diluted syngas stream of step (b) to a heat exchanger to produce a cooled syngas stream;
(d) contacting the cooled syngas stream of step (c) with liquid water to produce a humidified syngas stream having a $H_2O:CO$ molar ratio of about 0.2:1 to about 4:1;
(e) passing up to 100 volume percent of the humidified syngas stream to a water-gas shift reactor to produce a shifted syngas stream comprising additional hydrogen and carbon dioxide during a period of off-peak power demand;
(f) passing up to 100 volume percent of the shifted syngas stream from step (e) to a chemical process to produce a chemical product; and
(g) passing up to 100 volume percent of the humidified syngas stream from step (d) to a power producing process to produce electricity during a period of peak power demand.

The $H_2O:CO$ molar ratio in the humidified syngas stream can be chosen in response to a downstream syngas requirement such as, for example, a syngas feedstock requirement for the water gas shift reactor, fuel requirement for power production, or a combination thereof. The amount and/or temperature of the diluent combined with the raw syngas steam can be chosen to satisfy or achieve the target $H_2O:CO$ ratio. The humidified syngas may be passed to a water-gas shift reactor to produce a shifted syngas stream which then may be passed to a chemical process. Examples of chemical products that can be produced include, but are not limited to, methanol, alkyl formates, dimethyl ether, oxo aldehydes, ammonia, methane, hydrogen, Fischer-Topsch products, or a combination thereof.

The process of the invention, for example, can be used for the coproduction of electrical power and methanol. Thus, present invention also provides a process for the coproduction of power and methanol, comprising:
(a) reacting coal, petroleum coke, or mixture thereof with an oxidant stream in a gasifier to produce a raw syngas stream comprising hydrogen, carbon monoxide, carbon dioxide, and sulfur containing compounds;
(b) combining the raw syngas stream of step (a) with a diluent to produce a diluted syngas stream;
(c) passing the diluted syngas stream of step (b) to a heat exchanger to produce a cooled syngas stream;
(d) contacting the cooled syngas stream of step (c) with liquid water to produce a humidified syngas stream having a target $H_2O:CO$ molar ratio of about 0.2:1 to about 4:1;
(e) passing up to 100 volume percent of the humidified syngas stream to a water-gas shift reactor to produce a shifted syngas stream having a molar ratio of hydrogen to carbon monoxide of about 1:1 to about 20:1 during a period of off-peak power demand;
(f) contacting up to 100 volume percent of the shifted syngas stream with a catalyst effective for converting hydrogen and carbon monoxide into methanol; and
(g) passing up to 100 volume percent of the humidified syngas stream from step (d) to a power producing process to produce electricity during a period of peak power demand.

During a period of off-peak power demand, up to 100 volume percent of the cooled, humidified syngas stream may be passed to a water-gas shift reactor to increase the molar ratio of hydrogen to carbon monoxide and then contacted with a methanol catalyst to produce methanol. The shifted syngas stream may be used directly for methanol synthesis or blended with other unshifted syngas streams such as, for example, the raw or humidified syngas streams, to adjust the $H_2$:CO molar ratio to a desired level. Fixed bed or liquid slurry phase methanol reactors may be used. My process also may comprise removing a portion of the carbon dioxide and sulfur containing compounds before contacting the shifted syngas stream with the methanol catalyst.

Yet another aspect of the present invention is a system for coproducing power and chemicals from syngas, comprising:

(a) a gasifier for reacting a carbonaceous material with an oxidant stream to produce a raw syngas stream comprising hydrogen, carbon monoxide, carbon dioxide, and sulfur containing compounds;

(b) a dilution section for combining the raw syngas steam of step (a) with a diluent to produce a diluted syngas stream, wherein the amount and/or temperature of the diluent combined with the raw syngas is chosen in response to peak and off-peak power demands;

(c) a heat exchange section for cooling the diluted syngas stream of step (b) by a heat exchange process;

(d) a water quench section for contacting the cooled syngas stream of step (c) with liquid water to produce a humidified syngas stream having a $H_2O$:CO molar ratio of about 0.2:1 to about 4:1;

(e) a water-gas shift reaction section for converting up to 100 volume percent of the humidified syngas stream to a shifted syngas stream comprising additional hydrogen and carbon dioxide;

(f) a chemical producing section for converting up to 100 volume percent of the shifted syngas stream into a chemical product selected from methanol, alkyl formates, dimethyl ether, oxo aldehydes, ammonia, methane, Fischer-Topsch products, and combinations thereof during a period of off-peak power demand; and (f) a power producing section comprising a combustion turbine for converting up to 100 volume percent of the a humidified syngas stream from step (a) to electrical power during a period of peak power demand.

The system comprises a chemical producing section and a power producing section which can have different syngas requirements during periods of peak and off peak power demands on the power producing section. Accordingly, the amount and/or temperature of the diluent may be selected to produce a syngas having a $H_2O$:CO molar ratio needed for these applications. The amount and/or temperature of the diluent, therefore, can be varied in response to peak and off-peak power demands. As described previously, the chemical producing section can produce one or more chemicals during periods of off-peak power demand. For example, the chemical producing section can produce methanol using a fixed bed or slurry phase methanol reactor. The system may further comprise an acid gas removal section for removing all or a portion of the carbon dioxide, sulfur-containing compounds, or a combination thereof, to reduce poisoning of any process catalysts or to enhance the productivity of the chemical processes. The power producing section may comprise a combustion turbine for converting syngas to electrical power during a period of peak power demand. The power producing section also may further comprise a combined cycle power generating system.

DETAILED DESCRIPTION

Figure 1:
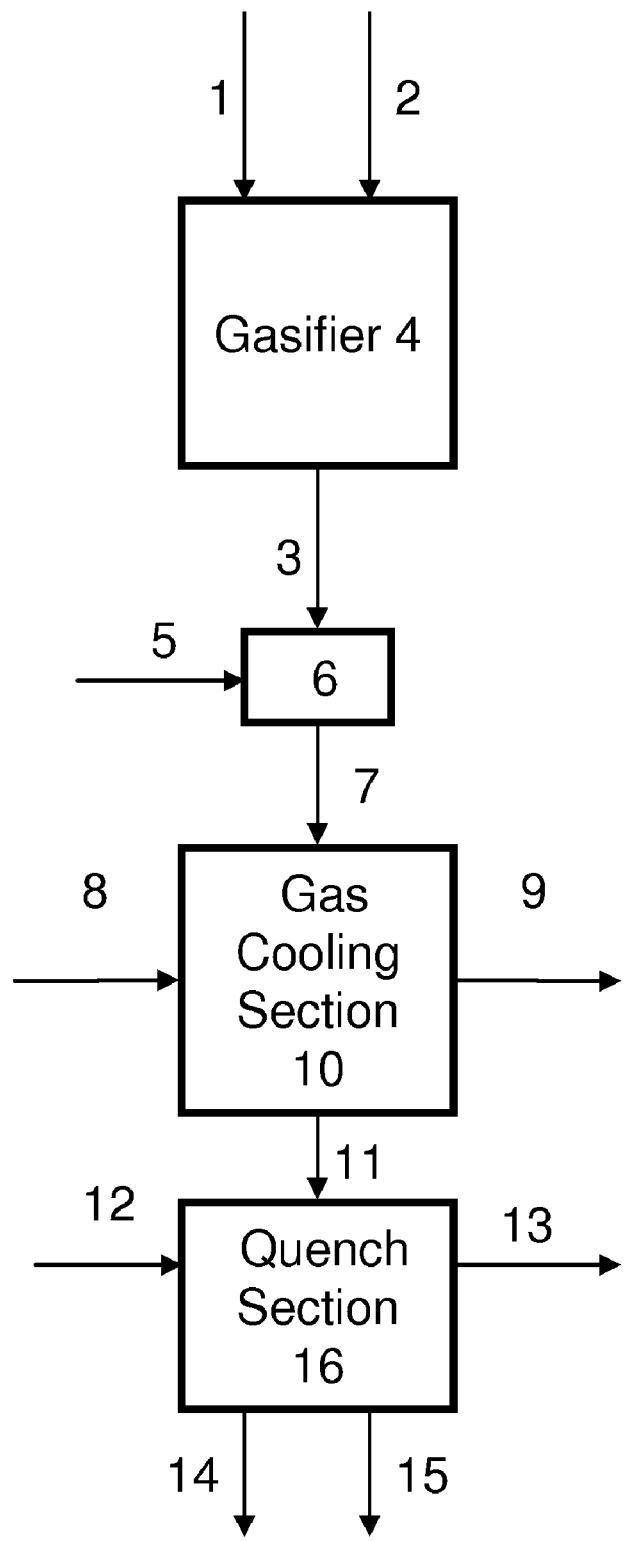
FIG. 1 is a schematic flow diagram that illustrates one embodiment of the present invention for producing humidified syngas.

The present invention provides a process for humidifying syngas in which the water to CO molar ratio of the humidified syngas can be precisely controlled and varied in response of one or more downstream syngas requirements. The syngas may be generated from any carbonaceous material by any means commonly used in the art such as, for example, by gasification of coal or by steam reforming of natural gas. The raw syngas is subjected to cooling heat exchange and quenching operations such that the sensible heat of the cooled syngas is sufficient to vaporize a fraction of the quench water in order to satisfy a target $H_2O$:CO molar ratio. In a general embodiment, therefore, the present invention provides a novel process for humidifying synthesis gas, comprising:

(a) reacting a carbonaceous material with oxygen, water, or carbon dioxide to produce a raw syngas stream comprising hydrogen, carbon monoxide, and carbon dioxide;

(b) combining the raw syngas stream of step (a) with a diluent to produce a diluted syngas stream;

(c) passing the diluted syngas stream of step (b) to a heat exchanger to produce a cooled syngas stream; and (d) contacting the cooled syngas stream of step (c) with liquid water to produce a humidified syngas stream having a $H_2O$:CO molar ratio of about 0.2:1 to about 4:1.

The process of the invention enables humidification of a syngas stream and the efficient recovery of any thermal energy that is not used for humidification. The invention also provides a method to efficiently and quickly vary the water to carbon monoxide molar ratio of a syngas stream to satisfy multiple downstream needs for syngas such as, for example, a chemical process and a power producing process, which may have different water:carbon monoxide molar ratio requirements. Thus, the present invention is useful for complex power and chemical cogeneration processes that could be used, for example, in an integrated gasification combined cycle system in which power and chemicals are coproduced in response to variable power demands.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms "a," "an" and "the" include their plural referents and, thus, are intended to be synonymous with the phrase "at least one" or "one or more" unless the context clearly dictates otherwise. For example, references to a "syngas stream," or a "gasifier," is intended to include one or more syngas streams, or gasifiers. References to a composition or process containing or including "an" ingredient or "a" step is intended to include other ingredients or other steps, respectively, in addition to the one named.

By "comprising" or "containing" or "including", we mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

My process comprises reacting a carbonaceous material with oxygen, water, or carbon dioxide to produce a raw synthesis gas (also referred to herein as "syngas") stream comprising hydrogen, carbon monoxide, and carbon dioxide. The term "carbonaceous" is used herein to describe various suitable feedstocks that contain carbon, and is intended to include gaseous, liquid, and solid hydrocarbons, hydrocarbonaceous materials, and mixtures thereof. Any combustible, or partially combustible, carbon-containing organic material, or slurries thereof, may be included within the definition of the term "carbonaceous". Solid, gaseous, and liquid feeds may be mixed and used simultaneously; and these may include paraffinic, olefinic, acetylenic, naphthenic, and aromatic compounds in any proportion. Also included within the definition of the term "carbonaceous" are oxygenated carbonaceous organic materials including carbohydrates, cellulosic materials, aldehydes, organic acids, alcohols, ketones, oxygenated fuel oil, waste liquids and by-products from chemical processes containing oxygenated carbonaceous organic materials, and mixtures thereof. For example, the carbonaceous material may comprise methane, petroleum residuum, coal, coke, lignite, oil shale, oil sands, peat, biomass, petroleum refining residues, petroleum cokes, asphalts, vacuum resid, heavy oils, or combinations thereof.

The carbonaceous material may be reacted in a gasifier, partial oxidizer, or reformer using any of a number of methods known in the art. For example, the carbonaceous material can comprise methane or natural gas and is reacted with water in reformer to produce syngas. The term "water", as used herein, is intended to include both liquid and vaporous water or steam. In another example, syngas can be produced by the reaction of coal or petroleum coke with oxygen in a gasifier.

One embodiment of the invention, for example, comprises continuously feeding an oxidant stream comprising at least 85 volume % oxygen into a gasifier in which oxygen is reacted with a carbonaceous material to produce a raw synthesis gas stream comprising carbon monoxide, hydrogen, carbon dioxide, and sulfur-containing compounds. Any one of several known gasification processes can be incorporated into the method of the instant invention. These gasification processes generally fall into broad categories as laid out, for example, in Chapter 5 of C. Higman and M. van der Burgt *Gasification*, (Elsevier, 2003). Examples are moving bed gasifiers such as the Lurgi dry ash process, the British Gas/Lurgi slagging gasifier, the Ruhr 100 gasifier; fluid-bed gasifiers such as the Winkler and high temperature Winkler processes, the Kellogg Brown and Root (KBR) transport gasifier, the Lurgi circulating fluid bed gasifier, the U-Gas agglomerating fluid bed process, and the Kellogg Rust Westinghouse agglomerating fluid bed process; and entrained-flow gasifiers such as the Texaco, Shell, Prenflo, Noell, E-Gas (or Destec), CCP, Eagle, and Koppers-Totzek processes. The gasifiers contemplated for use in the process may be operated over a range of pressures and temperatures of about 1 to about 103 bar absolute (abbreviated herein as "bara") and 400° C. to 2000° C., with preferred values within the range of about 21 to about 83 bara and temperatures between 500° C. to 1500° C. Depending on the type of gasifier and carbonaceous feedstock used therein, the preparation of the feedstock may comprise grinding, and one or more unit operations of drying and slurrying the ground feedstock in a suitable fluid such as, for example, water, organic liquids, or supercritical (liquid) carbon dioxide. Typical carbonaceous or hydrocarbonaceous materials that can be oxidized to produce syngas include, but are not limited to, petroleum residuum; bituminous, subbituminous, and anthracitic coals and cokes; lignite; oil shale; oil sands; peat, biomass; petroleum refining residues; petroleum cokes; asphalts; vacuum resid; heavy oils; and the like.

Oxygen, or another suitable gaseous stream containing substantial amounts of oxygen is charged to the gasifier, along with the carbonaceous feedstock. The oxidant stream may be prepared by any method known in the art, such as cryogenic distillation of air, pressure swing adsorption, membrane separation, or any combination therein. The purity of oxidant stream typically is at least 85 volume % oxygen, based on the total volume of the oxidant stream; for example, the oxidant stream may comprise at least 95 volume % oxygen or, in another example at least 98 volume % oxygen.

The oxidant stream and the prepared carbonaceous or hydrocarbonaceous feedstock are introduced into a gasifier wherein the oxidant is consumed and the feedstock is substantially converted into a raw synthesis gas (syngas) stream comprising carbon monoxide, hydrogen, carbon dioxide, water, and various impurities such as, for example, sulfur or sulfur-containing compounds. For the purposes of this invention, sulfur refers to any sulfur-containing compound, either organic or inorganic in nature. Examples of such sulfur-containing compounds are exemplified by hydrogen sulfide, sulfur dioxide, sulfur trioxide, sulfuric acid, elemental sulfur, carbonyl sulfide, mercaptans, and the like. Examples of other impurities which may be present in the raw syngas, for example, include hydrogen sulfide, carbonyl sulfide, methane, ammonia, hydrogen cyanide, hydrogen chloride, mercury, arsenic, and other metals, depending on the feedstock source and gasifier type. The precise manner in which the oxidant and feedstock are introduced into the gasifier is within the skill of the art; it is preferred that the process will be run continuously and at a substantially constant rate.

The raw syngas stream from the oxidation step such as, for example, the gasification of coal or petroleum coke, can be combined with a diluent to produce a diluted syngas stream. Any gas or liquid that will vaporize on mixing with the raw syngas stream can be used as the diluent. For example, according the invention, the diluent may comprise water (typically as steam), methane, ethane, propane, butane, recycled syngas, nitrogen, argon, helium, carbon dioxide, waste gases, combustion stack gases, or combinations thereof. In one embodiment, for example, the diluent may comprise water and may be introduced as a liquid directly into a conduit for the raw syngas stream or may be injected into the syngas stream as steam. The amount of diluent combined with the raw syngas stream is dependent, among other things, on the volume of the syngas stream, its temperature and composition, and the temperature of the diluent, and can range from about 1 to 100 mole % of the raw syngas stream, that is, about 1 mole to 100 moles of diluent is combined with every 100 moles of raw syngas. Other examples of diluent amounts are about 5 to about 75 mole %, and about 10 to 60 mole % of the raw syngas stream. The step of combining the raw syngas stream and the diluent advantageously may employ any one of the mixing devices well-known to persons skilled in art such as, for example, a mixing element such as a static mixer, spray ring, atomizer, baffles, or impinging devices.

Typically, the raw syngas stream will have a temperature of about 500 to about 2000° C. as it exits the gasifier, partial oxidizer, or reformer. Further examples of raw syngas temperatures are about 1000 to about 2000° C. and about 1000 to about 1500° C. The diluent typically will have a temperature that is less than the temperature of the raw syngas stream. Upon combination with the diluent, the resulting diluted syngas stream will typically have a lower temperature than the raw syngas stream. The difference in temperature between the raw and diluted syngas streams will vary according the volumes of each stream, their temperatures, and their compositions. The reduction in temperature caused by combination with the diluent enables the recovery of heat from the diluted syngas stream by a heat exchange process but with the retention of enough sensible heat to vaporize sufficient water to meet a desired water to carbon monoxide molar ratio. The term "sensible heat", as used herein, is intended to have its plain meaning as would be understood by a person of ordinary skill in the art, that is, "heat energy that causes a rise or fall in the temperature of a gas, liquid or solid when added or removed from that material". For example, as the amount of diluent combined with the raw syngas stream increases, less heat is recovered by the heat exchanger and the amount of sensible heat available to vaporize water increases. Thus, in one aspect of the invention, amount of diluent combined with the raw syngas can be varied to control the $H_2O:CO$ molar ratio in the humidified syngas stream.

The diluted syngas stream is passed to a heat exchanger to produce a cooled syngas stream. By the term "cooled", it is meant that the syngas stream exiting the heat exchanger is at a lower temperature than the diluted syngas stream entering the heat exchanger. The term "heat exchanger", as used herein, is understood to mean a device, which transfers the thermal energy from one medium to another such as, for example, a gas to another gas, a gas to a liquid, a liquid to another liquid, etc. For example, the diluted syngas can be passed to one or more of the following types of heat exchangers selected from steam generating heat exchangers (i.e., boilers), wherein heat is transferred from the syngas to boil water; gas-gas interchangers; boiler feed water exchangers; forced air exchangers; cooling water exchangers; or combinations of one or more of these heat exchangers. The use of multiple steam generating heat exchangers, producing successively lower pressure steam levels is contemplated to be within the scope of the instant invention. For example, the heat exchanger can comprises a radiant heat exchanger, convective heat exchanger, or a combination of one or more of these heat exchangers. Steam and condensate typically are generated from the heat exchange process and may embody one or more steam products of different pressures.

The cooled syngas stream is contacted with liquid water to produce a humidified syngas stream having a $H_2O:CO$ molar ratio of about 0.2:1 to about 4:1. Other examples of $H_2O:CO$ molar ratios in the humidified syngas stream are about 1:1 to about 3:1, about 1.5:1 to about 3:1, and about 2:1 to about 3:1. The contacting of the cooled syngas with water may be carried out by any gas-liquid contacting device or quench system known in the art which generally produces a large contact surface between a gas and a liquid. For example, the syngas may be simply sprayed into a water quench system having reservoir of water. In another example, the cooled syngas can be passed with concurrent or countercurrent flow of water into a scrubbing tower containing various forms of packing, baffles, bubble cap trays, sieve trays, and the like. In another example, the syngas may be subjected to various washers such as venturi washers, vortex washers, and rotary washers, all of which are well known in the art. Typically, the water contacting or quench system will have a reservoir of water that is maintained by influent and effluent flows of water. As the cooled syngas stream contacted with water in the quench system, the inflowing cooled syngas releases sensible heat and is further cooled upon contact with quench water. The sensible heat serves to increase the temperature of the quench water and vaporizes a portion of the quench water, thus humidifying the syngas. Thus, the influent and effluent flows of water to the quench system can be adjusted to control the temperature of the water in the quench system and, thus, the amount of water that is vaporized into the cooled syngas stream. The remaining portion of quench water not vaporized in the quench section may comprise water, soluble mineral content (i.e., salts, finely divided unreacted carbonaceous materials, dissolved syngas components, and other mineral fines) and eventually exits the quench system as effluent flow.

As noted above, the amount and temperature of the diluent combined with the raw syngas stream and the influent and effluent flows of water to the quench system are among the parameters that influence the molar ratio of water to carbon monoxide in the humidified syngas stream. Thus, by varying the amount and/or temperature of the diluent stream or the amount of the influent and effluent flows to the water quench system, the $H_2O:CO$ molar ratio of the humidified syngas stream can be varied, for example, in response to a downstream syngas requirement which can vary over time. The term "downstream syngas requirement," as used herein, means a need or requirement that occurs downstream of the point of production of the humidified syngas stream. "Syngas requirement", means a syngas need which can include a volume and/or compositional requirement such as, for example, a requirement for a syngas having a particular $H_2O:CO$ molar ratio, a $CO_2$ content, or a $H_2:CO$ molar ratio. According to the invention, therefore, the amount and/or temperature of the diluent that is combined with the raw syngas stream or the amount of influent and/or effluent flows of water in the water quench system may be varied over time in response to a downstream syngas requirement such as, for example, a feedstock need of a least one chemical process, a fuel need of at least one power plant, or a combination thereof. In another embodiment, for example, the H₂O:CO molar ratio can be chosen to respond to a downstream syngas requirement. The amount and/or temperature of the diluent or the amount of influent and/or effluent flows to the water quench system, in turn, may be chosen in response to that H₂O:CO molar ratio. The downstream requirement for syngas, thus the H₂O:CO ratio in the humidified syngas stream, can vary periodically. The term "periodically", as used herein, is understood to have its commonly accepted meaning of "associated with or occurring in time intervals or periods". The periods or time intervals may occur regularly, for example once every 24 hours, or irregularly.

The pressure of the steam generated from the diluted syngas stream also may be used to control the amount of water vaporized in the humidified syngas stream and, hence, its H₂O:CO molar ratio. The pressure of the steam determines the temperature of the steam and, thus, the amount of heat transferred in the heat exchanger. The pressure of the steam generated by passing the diluted syngas stream through a heat exchanger, therefore, may vary in response to a downstream syngas feedstock requirement. For example, as noted above, the H₂O:CO molar ratio of the humidified syngas stream can be chosen to respond to a downstream syngas requirement. The steam obtained by heat exchange of the diluted syngas stream can then be generated at a pressure chosen to satisfy that H₂O:CO molar ratio.

One example of a downstream syngas requirement is a feedstock need for a chemical process in which one or more of the hydrogen, carbon monoxide, or carbon monoxide present in the syngas is converted to a reaction product. Any chemical process that can efficiently convert a syngas feedstock into useful chemical product may be used. For example, the chemical process can comprise a process for methanol, alkyl formates, dimethyl ether, oxo aldehydes, ammonia, methane, hydrogen, Fischer-Topsch products, or a combination thereof. The water-gas shift reaction can be employed to alter the hydrogen to carbon monoxide molar ratio of the syngas and to provide the correct stoichiometry of hydrogen and carbon monoxide for chemical production. For example, up to 100 volume percent of humidified syngas stream, based on the total volume of the humidified syngas stream, can be passed to a water-gas shift reactor to produce a shifted syngas stream comprising additional hydrogen and carbon dioxide of varying molar ratios depending on the type of chemical process that is to receive the shifted syngas stream. The amount of diluent combined with the raw syngas stream can be chosen in response to the syngas requirement of the chemical process, depending on the water to carbon monoxide molar ratio that is needed for the water-gas shift reaction. The humidified syngas stream also can be blended with other syngas streams, for example, recycled or raw syngas streams, before passing to the water-gas shift reaction to achieve a target H₂O:CO molar ratio. Up to 100 volume percent of the shifted syngas stream, based on the total volume of the shifted syngas stream, may then be passed to a chemical process to produce methanol, alkyl formates, dimethyl ether, oxo aldehydes, ammonia, methane, Fischer-Topsch products, or a combination thereof. The shifted syngas stream also may be further blended with other, unshifted syngas streams such as, for example, recycled syngas or raw syngas streams, to adjust the H₂:CO molar ratio to a desired level before being passed to a chemical process. For example, the chemical process can comprise a water-gas shift process, a methanol process, or a combination thereof. The humidified syngas can be passed first to a water-gas shift reactor to produce a shifted syngas stream having a hydrogen to carbon monoxide molar ratio of about 1:1 to about 20:1. The shifted syngas stream is then passed to a methanol reactor to produce methanol.

In the water-gas shift reaction, the carbon monoxide in the syngas undergoes an equilibrium-limited reaction with water to produce additional hydrogen and carbon dioxide:

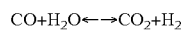

$$CO + H_2O \leftrightarrow CO_2 + H_2$$

By the term "additional", it is meant that syngas stream exiting the water-gas shift reactor has an higher mole percentage of hydrogen and carbon dioxide that the syngas stream entering the water-gas shift reactor. Typically the water-gas shift reaction is accomplished in a catalyzed fashion by methods known in the art. Advantageously, the water-gas shift catalyst is sulfur-tolerant. For example, such sulfur tolerant catalysts can include, but are not limited to, cobalt-molybdenum catalysts. Operating temperatures are typically 250° C. to 500° C.

The water-gas shift reaction may be accomplished in any reactor format known in the art for controlling the heat release of exothermic reactions. Examples of suitable reactor formats are single stage adiabatic fixed bed reactors; multiple-stage adiabatic fixed bed reactors with interstage cooling, steam generation, or cold-shotting; tubular fixed bed reactors with steam generation or cooling; and fluidized beds. Typically about 80-90% of the carbon monoxide will be converted to carbon dioxide and hydrogen in a single stage adiabatic reactor because of equilibrium limitations. Examples of hydrogen to carbon monoxide molar ratios that can be produced in the shifted syngas stream are about 1:1 to about 20:1, about 1.5:1 to about 10:1, about 2:1 to about 7:1, and about 1.5:1 to about 3:1. The shifted syngas stream may be used directly or blended with other unshifted syngas streams such as, for example, the raw or humidified syngas streams, to adjust the H₂:CO molar ratio to a desired level. If greater conversion is required (i.e., for hydrogen production), then additional stages with lower outlet gas temperatures may be used.

Because of the highly exothermic nature of the water-gas shift reaction, steam may be generated in the water-gas shift reaction zone by recovering heat from the shifted syngas stream as it exits the water gas-shift reaction and, typically, before it is sent to a chemical process. The steam generated in the water-gas shift reactor may be directed to a common steam header and used as general utility steam. Alternatively, the steam generated in the water-gas shift reactor can be used to supplement water to the humidified syngas stream entering the water-gas shift reactor by combining a portion of the steam with a portion of the cooled humidified syngas streams before that stream enters the water-gas shift reactor.

The molar ratio of H₂O:CO of the humidified syngas sent to the water-gas shift reaction typically is at least 1.5:1, but also can be at least 2:1 up to about 3:1. H₂O:CO ratios higher than 3:1 may also be used. The water vapor is required for several reasons. The water-gas shift reaction is exothermic and equilibrium-limited; increasing the concentration of the water reactant helps shift conversion toward hydrogen production. Moreover, increased concentrations of water help suppress the methanation reaction wherein CO reacts with hydrogen to produce methane and water. Methanation is highly exothermic and can cause local hot spots which may damage the catalyst and shorten its useful lifetime. Finally, water vapor has a relatively high heat capacity and acts to moderate the temperature rise of the reactant gases.

The methanol process can comprise any type of methanol synthesis plant that are well known to persons skilled in the art and many of which are widely practiced on a commercial basis. Most commercial methanol synthesis plants operate in the gas phase at a pressure range of about 25 to about 140 bara using various copper based catalyst systems well known in the art and depending on the technology used. A number of different state-of-the-art technologies are known for synthesizing methanol such as, for example, the ICI (Imperial Chemical Industries) process, the Lurgi process, the Haldor-Topsoe process, and the Mitsubishi process. Liquid phase processes are also well known in the art. Thus, the methanol process according to the present invention may comprise a fixed bed methanol reactor, containing a solid or supported catalyst, or liquid slurry phase methanol reactor, which utilizes a slurried catalyst in which metal or supported catalyst particles are slurried in an unreactive liquid medium such as, for example, mineral oil.

The syngas stream is typically supplied to a methanol reactor at the pressure of about 25 to about 140 bara, depending upon the process employed. The syngas then reacts over a catalyst to form methanol. The reaction is exothermic; therefore, heat removal is ordinarily required. The raw or impure methanol is then condensed and may be purified to remove impurities such as higher alcohols including ethanol, propanol, and the like or, burned without purification as fuel. The uncondensed vapor phase comprising unreacted syngas feedstock typically is recycled to the methanol process feed.

In addition to methanol, it is within the scope of the present invention to produce any chemical that is efficiently obtained from a syngas feedstock such as, for example, methanol, alkyl formates, oxo aldehydes, methane, ammonia, dimethyl ether, hydrogen, Fischer-Tropsch products, or a combination of one or more of these chemicals. For example, ammonia and/or hydrogen can be produced. In this example, the water-gas shift reaction would be operated to maximize hydrogen and carbon dioxide production. Typical conversions of carbon monoxide to hydrogen and carbon dioxide are greater than 95%. If desired, carbon dioxide can be removed by conventional absorption or adsorption technologies, followed by final purification step. For example, using pressure swing adsorption, the oxygenate content of the hydrogen typically can be reduced to less than 2 ppm by volume. The hydrogen can be sold or used to produce ammonia by the Haber-Bosch process by means known in the art as exemplified by LeBlance et al in "Ammonia", *Kirk-Othmer Encyclopedia of Chemical Technology*, Volume 2, 3$^{rd}$ Edition, 1978, pp. 494-500.

In another embodiment of the invention, Fischer-Tropsch products such as, for example, hydrocarbons and alcohols, can be produced via a Fischer-Tropsch reaction as exemplified in U.S. Pat. Nos. 5,621,155 and 6,682,711. Typically, the Fischer-Tropsch reaction may be effected in a fixed bed, in a slurry bed, or in a fluidized bed reactor. The Fischer-Tropsch reaction conditions may include using a reaction temperature of between 190° C. and 340° C., with the actual reaction temperature being largely determined by the reactor configuration. For example, when a fluidized bed reactor is used, the reaction temperature is preferably between 300° C. and 340° C.; when a fixed bed reactor is used, the reaction temperature is preferably between 200° C. and 250° C.; and when a slurry bed reactor is used, the reaction temperature is preferably between 190° C. and 270° C.

An inlet syngas pressure to the Fischer-Tropsch reactor of between 1 and 50 bar, preferably between 15 and 50 bar, may be used. The syngas may have a $H_2:CO$ molar ratio, in the fresh feed, of 1.5:1 to 2.5:1, preferably 1.8:1 to 2.2:1. The synthesis gas typically includes 0.1 wppm of sulfur or less. A gas recycle may optionally be employed to the reaction stage, and the ratio of the gas recycle rate to the fresh synthesis gas feed rate, on a molar basis, may then be between 1:1 and 3:1, preferably between 1.5:1 and 2.5:1. A space velocity, in $m^3$ (kg catalyst)$^{-1}$ hr$^{-1}$, of from 1 to 20, preferably from 8 to 12, may be used in the reaction stage.

In principle, an iron-based, a cobalt-based or an iron/cobalt-based Fischer-Tropsch catalyst can be used in the Fischer-Tropsch reaction stage, although Fischer-Tropsch catalysts operated with high chain growth probabilities (i.e., alpha values of 0.8 or greater, preferably 0.9 or greater, more preferably, 0.925 or greater) are typical. Reaction conditions are generally chosen to minimize methane and ethane formation. This tends to provide product streams which mostly include wax and heavy products, i.e., largely paraffinic $C_{20}$+linear hydrocarbons.

The iron-based Fischer-Tropsch catalyst may include iron and/or iron oxides which have been precipitated or fused. However, iron and/or iron oxides which have been sintered, cemented, or impregnated onto a suitable support can also be used. The iron should be reduced to metallic Fe before the Fischer-Tropsch synthesis. The iron-based catalyst may contain various levels of promoters, the role of which may be to alter one or more of the activity, the stability, and the selectivity of the final catalyst. Typical promoters are those influencing the surface area of the reduced iron ("structural promoters"), and these include oxides or metals of Mn, Ti, Mg, Cr, Ca, Si, Al, or Cu or combinations thereof.

The products from Fischer-Tropsch reactions often include a gaseous reaction product and a liquid reaction product. For example, the gaseous reaction product typically includes hydrocarbons boiling below about 343° C. (e.g., tail gases through middle distillates). The liquid reaction product (the condensate fraction) includes hydrocarbons boiling above about 343° C. (e.g., vacuum gas oil through heavy paraffins) and alcohols of varying chain lengths.

Oxo aldehydes also may be produced using hydroformylation processes that are well known in the art. The hydroformylation reaction is typically carried out by contacting an olefin such as, for example, ethylene or propylene, with carbon monoxide and hydrogen in the presence of a transition metal catalyst to produce linear and branched aldehydes. Examples of aldehydes that can be produced by hydroformylation include acetaldehyde, butyraldehyde, and isobutyraldehyde.

In another example, alkyl formates such as, for example, methyl formate may be produced in the chemical process. There are currently several known processes for the synthesis of alkyl formates from a syngas and alkyl alcohol feedstock such as, for example, as described in U.S. Pat. No. 3,716,619. Other examples of alkyl formate processes include U.S. Pat. No. 3,816,513, in which carbon monoxide and methanol are reacted in either the liquid or gaseous phase to form methyl formate at elevated pressures and temperatures in the presence of an alkaline catalyst and sufficient hydrogen to permit carbon monoxide to be converted to methanol, and U.S. Pat. No. 4,216,339, in which carbon monoxide is reacted at elevated temperatures and pressures with a current of liquid reaction mixture containing methanol and either alkali metal or alkaline earth metal methoxide catalysts to produce methyl formate. In the broadest embodiment of this invention, however, any effective commercially viable process for the formation of an alkyl formate from a feedstock comprising a corresponding alkyl alcohol and a prepared syngas sufficiently rich in carbon monoxide is within the scope of the invention. The catalyst or catalysts, as well as concentration, contact time, and the like, can vary widely, as is known to those skilled in the art. Examples of suitable catalysts are disclosed in U.S. Pat. No. 4,216,339, but a wide variety of other catalysts known to those skilled in the art also can be used.

The humidified syngas also can be passed to a power producing process. The power producing process comprises a means for converting chemical and kinetic energies in the syngas feed to electrical or mechanical energy, typically in the form of at least one turboexpander, also referred to hereinafter as "combustion turbine". Typically, the power-producing process will comprise a combined cycle system as the most efficient method for converting the energy in the syngas to electrical energy comprising a Brayton cycle and a Carnot cycle for power generation. In the combined cycle operation, the gaseous fuel is combined with an oxygen-bearing gas, combusted, and fed to one or more combustion turbines to generate electrical or mechanical energy. The hot exhaust gases from the combustion turbine or turbines are fed to one or more heat recovery steam generators (abbreviated herein as "HRSG") in which a fraction of the thermal energy in the hot exhaust gases is recovered as steam. The steam from the one or more HRSG's along with any steam generated in other sections of the process (i.e., by recovery of exothermic heat of chemical reactions) is fed to one or more steam turboexpanders to generate electrical or mechanical energy, before rejecting any remaining low level heat in the turbine exhaust to a condensation medium. Numerous variations on the basic combined cycle operation are known in the art. Examples are the HAT (humid air turbine) cycle and the Tophat cycle. All are suitable for use without limitation in the power producing process of the instant invention. For example, in one embodiment of the invention, the power producing process may comprise an integrated gasification combined cycle (abbreviated herein as "IGCC") power plant.

My invention, therefore, also provides a process for the coproduction of power and chemicals, comprising:
(a) reacting a carbonaceous material with an oxidant stream in a gasifier to produce a raw syngas stream comprising hydrogen, carbon monoxide, and carbon dioxide;
(b) combining the raw syngas stream of step (a) with a diluent to produce a diluted syngas stream;
(c) passing the diluted syngas stream of step (b) to a heat exchanger to produce a cooled syngas stream;
(d) contacting the cooled syngas stream of step (c) with liquid water to produce a humidified syngas stream having a $H_2O:CO$ molar ratio of about 0.2:1 to about 4:1;
(e) passing up to 100 volume percent of the humidified syngas stream to a water-gas shift reactor to produce a shifted syngas stream comprising additional hydrogen and carbon dioxide during a period of off-peak power demand;
(f) passing up to 100 volume percent of the shifted syngas stream from step (e) to a chemical process to produce a chemical product; and
(g) passing up to 100 volume percent of the humidified syngas stream from step (d) to a power producing process to produce electricity during a period of peak power demand.

It is understood that the above process comprises the various embodiments of the gasifier, syngas streams, oxidant stream, carbonaceous materials, diluent, heat exchangers, water:carbon monoxide molar ratios, water-gas shift reaction, water quench system, chemical products, and power producing processes as described hereinabove. For example, raw syngas stream can be produced by the partial oxidation of coal or petroleum coke in a gasifier. The purity of oxidant stream typically is at least 85 volume % oxygen, and may comprise at least 95 volume % oxygen or, in another example at least 98 volume % oxygen. The raw syngas, which typically has a temperature of about 1000 to about 2000° C., can be combined with a diluent to produce a diluted syngas stream. The diluent may comprise water, steam, methane, ethane, propane, butane, recycled syngas, nitrogen, argon, helium, carbon dioxide, waste gases, combustion stack gases, or combinations thereof. As described previously, the diluent may comprise water and may be introduced as a liquid directed into a conduit for the raw syngas stream or may be injected into the syngas stream as steam.

The diluted syngas stream is passed to a heat exchanger to produce a cooled syngas stream. For example, the heat exchanger can comprises a radiant heat exchanger, convective heat exchanger, or a combination of one or more of these heat exchangers. Steam and condensate can be generated from the heat exchange process and may embody one or more steam products of different pressures. The cooled syngas stream is contacted with liquid water to produce a humidified syngas stream having a $H_2O:CO$ molar ratio of about 0.2:1 to about 4:1. Other examples of $H_2O:CO$ molar ratios in the humidified syngas stream are about 1:1 to about 3:1, about 1.5:1 to about 3:1, and about 2:1 to about 3:1. The contacting of the cooled syngas with water may be carried out by any gas-liquid contacting device or quench system known in the art which generally produces a large contact surface between a gas and a liquid. For example, the syngas may be simply sparged into a water quench system having reservoir of water that is maintained by influent and effluent flows of water.

As noted previously, the amount and temperature of the diluent combined with the raw syngas stream and the influent and effluent flows of water to the quench system are among the parameters that influence the molar ratio of water to carbon monoxide in the humidified syngas stream. Thus, by varying the amount and/or temperature of the diluent stream or the amount of the influent and effluent flows to the water quench system, the $H_2O:CO$ molar ratio of the humidified syngas stream can be varied. According to the invention, therefore, the amount and/or temperature of the diluent that is combined with the raw syngas stream or the amount of influent and/or effluent flows of water in the water quench system may be varied over time in response to a downstream syngas requirement such as, for example, a feedstock requirement for a water-gas shift reactor or a fuel requirement for a power producing process. In another embodiment, for example, the $H_2O:CO$ molar ratio can be chosen to respond to a syngas feedstock requirement for the water-gas shift reactor or a fuel requirement for the power producing process. The amount and/or temperature of the diluent or the amount of influent and/or effluent flows to the water quench system, in turn, may be chosen to attain the selected $H_2O:CO$ molar ratio.

The pressure of the steam generated from the diluted syngas stream also may be used to control the amount of water vaporized in the humidified syngas stream and, hence, its $H_2O:CO$ molar ratio. Therefore, in one aspect of the invention, the pressure of the steam generated by passing the diluted syngas stream through a heat exchanger varies in response to a syngas feedstock requirement for the water-gas shift reactor or a fuel requirement for the power producing process. For example, as noted above, the $H_2O:CO$ molar ratio of the humidified syngas stream can be chosen to respond to the above water-gas feedstock and power producing process fuel requirements. The steam obtained by heat exchange of the diluted syngas stream can then be generated at a pressure chosen to satisfy that $H_2O:CO$ molar ratio.

Up to 100 volume percent of the humidified syngas stream, based on the total volume of the humidified gas stream, can be passed to a water-gas shift reactor to produce a shifted syngas stream comprising additional hydrogen and carbon dioxide as described previously. For example, the humidified syngas stream can be sent to the water-gas shift reactor during a period of off-peak power demand on a power producing plant or process. The term "peak power demand", as used herein within the context of the present invention, means the maximum power demand on the power producing zone within a given 24 hour period of time. The phrase "period of peak power demand", as used herein, means one or more intervals of time within the above 24 hour period in which the power demand on the power producing zone is at least 90% of the maximum power demand. By contrast, "period of off-peak power demand", as used herein, means one or more intervals of time within a given 24 hour period in which the power demand on the power producing zone is less than 90% of the peak power demand as defined above.

Steam may be generated in the water-gas shift reaction zone by recovering heat from the shifted syngas stream as it exits the water gas-shift reaction and, typically, before it is sent to a chemical process. The shifted syngas stream from the water-gas shift reactor will generally have a hydrogen:CO molar ratio of about 1:1 to about 20:1. Additional examples of hydrogen:carbon monoxide molar ratios that can be produced in the shifted syngas stream are about 1.5:1 to about 10:1, about 2:1 to about 7:1, and about 1.5:1 to about 3:1. The shifted syngas stream may be used directly or blended with other unshifted syngas streams such as, for example, the raw or humidified syngas streams, to adjust the $H_2$:CO molar ratio to a desired level. If greater conversion is required (i.e., for hydrogen production), then additional stages with lower outlet gas temperatures may be used.

As described previously, up to 100 volume percent of the shifted syngas stream may be passed to a chemical process to produce a chemical product such as, for example, methanol, alkyl formates, dimethyl ether, oxo aldehydes, ammonia, methane, Fischer-Topsch products, or a combination thereof. In one embodiment, for example, the chemical process can comprise a methanol process.

Up to 100 volume percent of the humidified syngas stream also may be passed to a power producing process to produce electricity during a period of peak power demand. For example, the power producing process may comprise a combined cycle system and any one of the variations on the basic combined cycle operation that are known in the art and described hereinabove. The power producing process also may comprise an integrated gasification combined cycle (abbreviated herein as "IGCC") power plant.

The process of the invention further provides for the coproduction of power and methanol. Thus, another aspect of the invention is a process comprising:

(a) reacting coal, petroleum coke, or mixture thereof with an oxidant stream in a gasifier to produce a raw syngas stream comprising hydrogen, carbon monoxide, carbon dioxide, and sulfur containing compounds;

(b) combining the raw syngas stream of step (a) with a diluent to produce a diluted syngas stream;

(c) passing the diluted syngas stream of step (b) to a heat exchanger to produce a cooled syngas stream;

(d) contacting the cooled syngas stream of step (c) with liquid water to produce a humidified syngas stream having a target $H_2O$:CO molar ratio of about 0.2:1 to about 4:1;

(e) passing up to 100 volume percent of the humidified syngas stream to a water-gas shift reactor to produce a shifted syngas stream having a molar ratio of hydrogen to carbon monoxide of about 1:1 to about 20:1 during a period of off-peak power demand;

(f) contacting up to 100 volume percent of the shifted syngas stream with a catalyst effective for converting hydrogen and carbon monoxide into methanol; and (g) passing up to 100 volume percent of the humidified syngas stream from step (d) to a power producing process to produce electricity during a period of peak power demand.

Persons of skill in the art will understand that the above process comprises the various embodiments of the gasifier, syngas streams, oxidant stream, carbonaceous materials, diluent, heat exchangers, water:carbon monoxide molar ratios, water quench system, chemical products, and power producing processes as described hereinabove. The raw syngas can be combined with a diluent comprising, for example, water, steam, recycled syngas, nitrogen, argon, helium, methane, ethane, propane, butane, carbon dioxide, waste gases, combustion stack gases, or combinations thereof, to produce a diluted syngas stream.

The diluted syngas stream is passed to a heat exchanger to produce a cooled syngas stream that is contacted with liquid water to produce a humidified syngas stream having a target $H_2O$:CO molar ratio of about 0.2:1 to about 4:1. The contacting of the cooled syngas with water may be carried out by any gas-liquid contacting device or quench system known in the art which generally produces a large contact surface between a gas and a liquid. For example, the syngas may be simply sparged into a water quench system having reservoir of water that is maintained by influent and effluent flows of water. The term "target", as used herein, means that the $H_2O$:CO molar ratio of the humidified syngas stream is chosen as goal or value intended to be attained in response to a downstream syngas requirement. For example, the target $H_2O$:CO molar ratio may be chosen in response to off peak and peak power demands in accordance with the different syngas requirements for the water-gas shift reactor and power producing zone during these periods. Other examples of $H_2O$:CO molar ratios in the humidified syngas stream are about 1:1 to about 3:1, about 1.5:1 to about 3:1, and about 2:1 to about 3:1. As described previously, the amount and/or temperature of the diluent combined with the raw syngas stream and the influent and effluent flows of water to the quench system are among the parameters that can influence the molar ratio of water to carbon monoxide in the humidified syngas stream. Thus, the amount and/or temperature of the diluent or the amount of influent and/or effluent flows of water to the water quench system may be chosen to satisfy the target $H_2O$:CO molar ratio of the humidified syngas stream. As described previously, the pressure of the steam generated by cooling the diluted syngas also may be used to control the $H_2O$:CO molar ratio of the humidified syngas stream. The process of the invention, therefore, further comprises generating steam in step (c) at a pressure to satisfy the target $H_2O$:CO molar ratio.

During a period of off-peak power demand on a power producing plant or process, up to 100 volume percent of the humidified syngas stream can be passed to a water-gas shift reactor to produce a shifted syngas stream comprising additional hydrogen and carbon dioxide as described previously. The shifted syngas stream from the water-gas shift reactor will generally have a hydrogen:CO molar ratio of about 1:1 to about 20:1. Additional examples of hydrogen to carbon monoxide molar ratios that can be produced in the shifted syngas stream are about 1.5:1 to about 10:1, about 2:1 to about 7:1, and about 1.5:1 to about 3:1.

Our novel process may further comprise passing the shifted syngas stream from step (e) to one or more acid gas removal processes in which acidic gases such as, for example, hydrogen sulfide or carbon dioxide, are removed or their concentrations reduced. For example, it is often desirable to remove sulfur-containing compounds present in the shifted syngas in an acid gas removal process to prevent poisoning of any catalysts when the gas is used for chemical synthesis or to reduce sulfur emissions to the environment when the gas is used for power production. According to the invention, therefore, acid gas removal process may comprise a sulfur removal process which may employ any of a number of methods known in the art for removal of sulfur-containing compounds from gaseous streams. For the purposes of this invention, sulfur refers to any sulfur-containing compound, either organic or inorganic in nature. Examples of such sulfur-containing compounds are exemplified by hydrogen sulfide, sulfur dioxide, sulfur trioxide, sulfuric acid, elemental sulfur, carbonyl sulfide, mercaptans, and the like.

The sulfurous compounds may be recovered from the syngas feed to the sulfur removal zone by chemical absorption methods, exemplified by using caustic soda, potassium carbonate or other inorganic bases, or alkanol amines. Examples of suitable alkanolamines for the present invention include primary, secondary, and tertiary amino alcohols containing a total of up to 10 carbon atoms and having a normal boiling point of less than about 250° C. Specific examples include primary amino alcohols such as monoethanolamine (MEA), 2-amino-2-methyl-1-propanol (AMP), 1-aminobutan-2-ol, 2-amino-butan-1-ol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-pentanol, 3-amino-3-methyl-1-butanol, 3-amino-3-methyl-2-butanol, 2-amino-2,3-dimethyl-1-butanol, secondary amino alcohols such as diethanolamine (DEA), 2-(ethylamino)-ethanol (EAE), 2-(methylamino)-ethanol (MAE), 2-(propylamino)-ethanol, 2-(isopropylamino)-ethanol, 2-(butylamino)-ethanol, 1-(ethylamino)-ethanol, 1-(methylamino)-ethanol, 1-(propylamino)-ethanol, 1-(isopropylamino)-ethanol, and 1-(butylamino)-ethanol, and tertiary amino alcohols such as triethanolamine (TEA), and methyl-diethanol-amine (MDEA).

Alternatively, sulfur in the shifted syngas may be removed by physical absorption methods. Examples of suitable physical absorbent solvents are methanol and other alkanols, propylene carbonate and other alkyl carbonates, dimethyl ethers of polyethylene glycol of two to twelve glycol units and mixtures thereof (commonly known under the trade name of Selexol™ solvents), n-methyl-pyrrolidone, and sulfolane. Physical and chemical absorption methods may be used in concert as exemplified by the Sulfinol™ process using sulfolane and an alkanolamine as the absorbent, or the Amisol™ process using a mixture of an amine and methanol as the absorbent.

The sulfur-containing compounds may be recovered from the gaseous feed to the sulfur removal process by solid sorption methods using fixed, fluidized, or moving beds of solids exemplified by zinc titanate, zinc ferrite, tin oxide, zinc oxide, iron oxide, copper oxide, cerium oxide, or mixtures thereof. If necessary for chemical synthesis needs, the chemical or physical absorption processes or solid sorption processes may be followed by an additional method for final sulfur removal. Examples of final sulfur removal processes are adsorption on zinc oxide, copper oxide, iron oxide, manganese oxide, and cobalt oxide.

Typically at least 90 mole percent, more typically at least 95 mole percent, and even more typically, at least 99 mole percent of the total sulfur-containing compounds present in shifted syngas stream can be removed in the sulfur removal process. Typically, syngas used for chemical production requires more stringent sulfur removal, i.e., at least 99.5% removal, to prevent deactivation of chemical synthesis catalysts, more typically the effluent gas from the sulfur removal zone contains less than 5 ppm by volume sulfur.

In addition to sulfur, a portion of the carbon dioxide present may be removed in an gas removal process before passing shifted syngas stream to a chemical process. Removal or reduction of carbon dioxide may comprise any of a number of methods known in the art. Carbon dioxide in the gaseous feed may be removed by chemical absorption methods, exemplified by using caustic soda, potassium carbonate or other inorganic bases, or alkanol amines. Examples of suitable alkanolamines for the present invention include primary, secondary, and tertiary amino alcohols containing a total of up to 10 carbon atoms and having a normal boiling point of less than about 250° C. Specific examples include primary amino alcohols such as monoethanolamine (MEA), 2-amino-2-methyl-1-propanol (AMP), 1-aminobutan-2-ol, 2-amino-butan-1-ol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 2-amino-2-methyl-1-pentanol, 3-amino-3-methyl-1-butanol, 3-amino-3-methyl-2-butanol, 2-amino-2,3-dimethyl-1-butanol, and secondary amino alcohols such as diethanolamine (DEA), 2-(ethylamino)-ethanol (EAE), 2-(methylamino)-ethanol (MAE), 2-(propylamino)-ethanol, 2-(isopropylamino)-ethanol, 2-(butylamino)-ethanol, 1-(ethylamino)-ethanol, 1-(methylamino)-ethanol, 1-(propylamino)-ethanol, 1-(isopropylamino)-ethanol, and 1-(butylamino)-ethanol, and tertiary amino alcohols such as triethanolamine (TEA), and methyl-diethanol-amine (MDEA).

Alternatively, a portion of the carbon dioxide in the shifted syngas may be removed by physical absorption methods. Examples of suitable physical absorbent solvents are methanol and other alkanols, propylene carbonate and other alkyl carbonates, dimethyl ethers of polyethylene glycol of two to twelve glycol units and mixtures thereof (commonly known under the trade name of Selexol™ solvents), n-methyl-pyrrolidone, and sulfolane. Physical and chemical absorption methods may be used in concert as exemplified by the Sulfinol™ process using sulfolane and an alkanolamine as the absorbent, or the Amisol™ process using a mixture of an amine and methanol as the absorbent. If necessary for chemical synthesis needs, the chemical or physical absorption processes may be followed by an additional method for final carbon dioxide removal. Examples of final carbon dioxide removal processes are pressure or temperature-swing adsorption processes.

When required for a particular chemical synthesis process, typically at least 60%, more typically, at least 80% of the carbon dioxide in the feed gas may be removed in the acid gas removal process. For example, the process of the invention may further comprise removing the carbon dioxide from shifted syngas stream to give a carbon dioxide concentration of about 0.5 to about 10 mole %, based on the total moles of gas in the synthesis gas stream, before contacting the shifted syngas with a methanol catalyst. In another example, the carbon dioxide may be removed from shifted syngas stream to a concentration of about 2 to about 5 mole %. Many of the sulfur and carbon dioxide removal technologies are capable of removing both sulfur and carbon dioxide. Thus, the sulfur and carbon dioxide removal step may be integrated together to simultaneously remove sulfur and carbon dioxide either selectively, (i.e. in substantially separate product streams) or non-selectively, (i.e., as one combined product stream) by means well known in the art.

The acid gas removal process may be preceded by a gas cooling step, as described hereinabove, to reduce the temperature of the crude syngas as required by the particular acid gas removal technology utilized therein. Heat energy from the syngas may be recovered through steam generation in the cooling train by means known in the art. The gas cooling zone may optionally comprise other absorption, adsorption, or condensation steps for removal or reaction of trace impurities, e.g., such as ammonia, hydrogen chloride, hydrogen cyanide, trace metals such as mercury, arsenic, and the like. The gas cooling zone, optionally, may comprise a reaction step for converting carbonyl sulfide to hydrogen sulfide and carbon dioxide via reaction with water.

The shifted syngas stream may be passed to a methanol reactor wherein up to 100 volume percent of the stream, based on the total volume of the shifted syngas stream, can be contacted with a catalyst effective for converting hydrogen and carbon monoxide into methanol. The shifted syngas stream having a high $H_2$:CO molar ratio can be blended with other, non-shifted syngas streams to adjust the $H_2$:CO molar ratio to the desired level. The term "effective", as used herein, it is meant that the catalyst is capable of converting at least 1 mole % of the carbon monoxide present in the shifted syngas stream to methanol per pass through a methanol reactor using any type of methanol synthesis process that is well known to persons skilled in the art and which are widely practiced on a commercial basis. For example, most commercial methanol processes operate in the gas phase at a pressure range of about 25 to about 140 bar absolute using various copper based catalyst systems depending on the technology used. A number of different state-of-the-art technologies are known for synthesizing methanol such as, for example, the ICI (Imperial Chemical Industries) process, the Lurgi process, the Haldor-Topsoe process, and the Mitsubishi process. The shifted syngas stream is contacted with the catalyst in a fixed bed methanol reactor or in a liquid slurry phase methanol reactor as described previously.

The humidified syngas stream may be passed to a power producing process to produce electricity during a period of peak power demand. As described previously, the power producing process may comprise a combined cycle system and any one of the variations on the basic combined cycle operation that are known in the art and described hereinabove. For example, the power producing process may comprise an integrated gasification combined cycle (abbreviated herein as "IGCC") power plant.

The present invention also provides a system for coproducing power and chemicals from syngas, comprising:
(a) a gasifier for reacting a carbonaceous material with an oxidant stream to produce a raw syngas stream comprising hydrogen, carbon monoxide, carbon dioxide, and sulfur containing compounds;
(b) a dilution section for combining the raw syngas steam of step (a) with a diluent to produce a diluted syngas stream, wherein the amount of the diluent combined with the raw syngas is chosen in response to peak and off-peak power demands;
(c) a heat exchange section for cooling the diluted syngas stream of step (b) by a heat exchange process;
(d) a water quench section for contacting the cooled syngas stream of step (c) with liquid water to produce a humidified syngas stream having a $H_2O$:CO molar ratio of about 0.2:1 to about 4:1;
(e) a water-gas shift reaction section for converting up to 100 volume percent of the humidified syngas stream to a shifted syngas stream comprising additional hydrogen and carbon dioxide;
(f) a chemical producing section for converting up to 100 volume percent of the shifted syngas stream into a chemical product selected from methanol, alkyl formates, dimethyl ether, oxo aldehydes, ammonia, methane, Fischer-Topsch products, and combinations thereof during a period of off-peak power demand; and
(g) a power producing section comprising a combustion turbine for converting up to 100 volume percent of the a humidified syngas stream from step (a) to electrical power during a period of peak power demand.

The above system is understood to include the various embodiments of the gasifier, syngas streams, oxidant stream, carbonaceous materials, diluent, heat exchangers, water:carbon monoxide molar ratios, water quench system, chemical products, acid gas removal processes, and power producing processes as described hereinabove.

One embodiment of the process of the invention may be illustrated with particular reference to the block flow diagram shown in FIG. 1. It will be readily apparent to persons of ordinary skill in the art and from the description provided herein, that the description that follows is not intended to be limiting, and that other variations of the process illustrated in FIG. 1 are possible and contemplated in the present invention. In the embodiment set forth in FIG. 1, an oxidant stream 2 and the prepared carbonaceous feedstock 1 are introduced into gasifier 4 wherein the oxidant is consumed and the feedstock is substantially converted into a raw synthesis gas (syngas) stream 3 comprising carbon monoxide, hydrogen, carbon dioxide, water, melted mineral matter, unreacted carbonaceous feedstock, and various impurities such as, for example, sulfur-containing compounds.

The gasifiers contemplated for use in the process may be operated over a range of pressures and temperatures between about 1 to about 103 bar absolute (abbreviated herein as "bara") and 400° C. to 2000° C., with preferred values within the range of about 21 to about 83 bara and temperatures between 500° C. to 1500° C. Depending on the carbonaceous or hydrocarbonaceous feedstock used therein and type of gasifier utilized to generate raw syngas, preparation of the feedstock may comprise grinding, and one or more unit operations of drying and slurrying the ground feedstock in a suitable fluid (e.g., water, organic liquids, supercritical or liquid carbon dioxide). Typical carbonaceous or hydrocarbonaceous materials which can be oxidized to produce syngas include, but are not limited to, petroleum residuum, bituminous, subbituminous, and anthracitic coals and cokes, lignite, oil shale, oil sands, peat, biomass, petroleum refining residues, petroleum cokes, asphalts, vacuum resid, heavy oils, and the like.

The oxidant stream 2 may be prepared by any method known in the art, such as cryogenic distillation of air, pressure swing adsorption, membrane separation, or any combination therein. The purity of oxidant stream typically is at least 90 volume % oxygen; for example, the oxidant stream may comprise at least 95 volume % oxygen or, in another example at least 98 volume % oxygen. Optionally, steam may be added to the oxidant stream to moderate the temperature in the vicinity of the partial oxidation burner.

The raw syngas of stream 3, typically at a temperature of about 1000 to about 1500° C., is conveyed to dilution section 6 and combined with diluent stream 5 to produce diluted syngas stream 7. The diluent stream 5 may comprise water, recycled humidified syngas, i.e., a portion of humidified gas stream 15 or a derivative therein, or other substances inert under the conditions of the cooling and quenching operations. Examples of inerts include nitrogen, argon, helium, carbon dioxide, tail gases from downstream chemical producing sections, and oxygen-depleted combustion stack gases. Preferably stream 5 comprises water.

The flow rate of stream 5 is dictated by the desired $H_2O:CO$ molar ratio of humidified syngas stream 15. Typically the ratio of the molar flow rate of stream 5 to stream 3 will be about 0.0:1.0 to about 1.0:1.0, more typically about 0.0:1.0 to about 0.5:1.0, even more typically, about 0.0:1.0 to about 0.25:1.0. The lower the ratio of the molar flow rate of stream 5 to stream 3, the lower the $H_2O:CO$ molar ratio of humidified syngas stream 15.

The temperature of stream 5 also affects the $H_2O:CO$ molar ratio of humidified syngas stream 15. As the temperature of stream 5 is decreased, the $H_2O:CO$ molar ratio of humidified syngas stream 15 is also decreased. In order for stream 5 to function as a temperature moderator, it is desirable that the temperature of stream 5 is less than the temperature of the raw syngas stream 3. Preferably the temperature of stream 15 is substantially lower than the temperature of stream 3. For example, the temperature of stream 15 is about 10 to about 360° C. or, in another example, about 30 to about 300° C.

It is desirable that stream 5 is at a pressure that is sufficient to overcome any pressure drop associated with controlling the flow rate of the stream as well as any pressure drop associated with the mixing process. Thus, the pressure of stream 5 is at least as great as the pressure of stream 3, more typically at least 0.1 to at least 10 bara greater than the pressure of stream 3.

A portion of the sensible heat energy from syngas stream 7 may be recovered through steam generation in gas cooling section 10 by means known in the art to produce cooled syngas stream 11. Gas cooling section 10 may comprise any or all of the following types of heat exchangers; steam generating heat exchangers (i.e., boilers) wherein heat is transferred from the syngas to boil water, gas-gas interchangers including steam superheaters, and boiler feed water exchangers. Heat transfer within gas cooling section 10 may occur by radiant and/or convective heat transfer mechanisms. The use of multiple heat exchangers, producing multiple steam pressures, boiler feed heating, and superheating is contemplated to be within the scope of the instant invention. Steam generated within gas cooling section 10 exits via conduit 9. It is understood that conduit 9 may embody one or more steam products of different pressures. Boiler feed water required for steam generation enters gas cooling 10 via conduit 8. It is understood that conduit 8 may embody one or more boiler feed water streams of different pressures or temperatures as required for steam generation. The use of multiple boiler feed water heat exchangers is contemplated to be within the scope of the instant invention. It is contemplated to be within the scope of the present invention that multiple heat transfer devices may be physically located within the same vessel or shell.

Mixing section 6 may be physically located in the heat exchange equipment comprising gas cooling section 10. Mixing section 6 may comprise any means known in the art for introducing and mixing two streams. Examples are spray rings, atomizers, baffles, impinging devices, and other mixing devices such as static mixers.

Cooled syngas stream 11 enters quench section 16 wherein the stream is directly contacted with a water reservoir maintained by an inflow of quench water via conduit 12. Within quench section 16, the inflowing cooled syngas 11 releases sensible heat and is further cooled upon contact with quench water 12. The sensible heat serves to increase the temperature of the quench water and vaporizes a portion of the quench water, thus humidifying the syngas, wherein humidified syngas exits via conduit 15.

The remaining portion of quench water not vaporized in the quench section exits via conduit 13 and may comprise, water, soluble mineral content, i.e., salts, finely divided unreacted carbonaceous materials, dissolved syngas components, and other mineral fines.

Solidified mineral content, i.e., slag, exits the quench section via conduit 14. Typically the wet slag exiting via conduit 14 comprises at least 25 weight percent water more typically about 50 weight percent water. The slag may also comprise unreacted carbon, sulfur, and trace metals. Typically the slag is discharged from the quench section in a batch-wise fashion.

The flow of water via conduit 12 to the quench reservoir and the remaining sensible heat of the cooled syngas of step (c) is sufficient to vaporize a fraction of the quench water such that the effluent syngas is humidified to a desired $H_2O:CO$ molar ratio. It is advantageous that the flow of water via conduit 12 is sufficient that liquid water remain in the quench reservoir at all times. Thus, it is desirable that the water flow via conduit 12 be such that the sensible heat content released by cooled syngas 11 upon contact and mixing with quench water 12 is less than required to vaporize all of quench water 12 at the pressure conditions in gas cooling section 10. For example, less than about 75% of quench water 12 may be vaporized upon contact with cooled syngas 11. In another example, less than about 50% of quench water 12 may be vaporized.

The principles laid out in the instant invention are further illustrated with the following example. Increasing the flow via conduit 5 tends to lower the temperature of the resultant mixed stream 7. Since the magnitude of heat transfer is proportional to the difference between the temperature of the process fluid (i.e., the syngas stream 7) and the heat transfer medium temperature, (e.g., the temperature of the steam being generated), moderating the temperature syngas 7 by addition of stream 5 lowers the rate and net heat transfer achievable in gas cooling section; less sensible heat content is removed from cooled syngas stream 11 in gas cooling section 10. This additional sensible heat content of stream 11 is then transferred to quench water 12 in quench section 16, resulting in vaporization of a larger portion of quench water 12. Thus, the $H_2O:CO$ molar ratio of humidified syngas stream 15 is increased. Moreover, since radiant heat transfer is proportional to the difference between the gas temperature and heat sink temperature (i.e., the steam generation temperature) each to the fourth power, the heat flux in a radiant cooler falls off rapidly as the gas temperature decreases toward that of the heat sink temperatures, resulting large differences in net heat transfer in the gas cooling section 10. Thus, relatively small changes in the temperature of stream 7 have commensurately larger impact on the $H_2O:CO$ molar ratio of stream 15 when the radiant mode of heat transfer dominates in gas cooling section 10.

In an analogous fashion, if the flow of conduit 15 were decreased, syngas stream 7 would be hotter and more heat would be removed in gas cooling section 10. In turn, the water content of humidified gas stream 15 would be decreased. The $H_2O:CO$ molar ratio of stream 15 is further affected by the temperature and flow of stream 12, and to a lesser extent the temperature of heat transfer media (e.g., steam or boiler feed water temperatures) utilized in gas cooling section 10.

Thus, by changing the temperature and flow rate of streams 5 and 12, and the temperature of the heat transfer media in gas cooling section 10, the $H_2O:CO$ molar ratio of humidified syngas stream 15 can be varied over a wide range, for example from about 1.0:1 to about 3:1. The variation in $H_2O:CO$ molar ratio of the humidified syngas can be controlled, readily, precisely, and in a rapid fashion to meet time variant downstream syngas requirements, without undo equipment and capital burdens. Further, steam generation can be maximized during periods when the low $H_2O:CO$ molar ratios of the humidified syngas are required downstream (i.e., during peak power generation) and steam generation decreased, when downstream syngas requirements are for higher $H_2O:CO$ molar ratios (i.e., methanol production).

EXAMPLES

General—A better understanding of the invention is provided with particular reference to the examples given below. For Examples 1 through 16, heat and material balance calculations were carried out using process simulation software to illustrate the aspects of the instant invention. The values for temperature, pressure, flow rate, were calculated using standard vapor-liquid equilibrium equations and heat transfer equations known in the art and which may be found in standard engineering texts such as, for example, *Perry's Handbook of Chemical Engineering*, $6^{th}$ ed., New York, McGraw Hill, 1984. The following prophetic gas compositions are expected from the indicated gasification conditions: Illinois coal #6 with an expected composition of 61.46 weight % carbon, 12.3% ash, 4.83% sulfur, 12% water, 4.37% hydrogen, 3.87% oxygen, 1.03% nitrogen, and 0.14 weight % chlorine is slurried with water to give an apparent slurry concentration of 64% coal solids. The coal slurry is fed with 0.86 lb of oxygen per lb of coal as received to a gasifier to produce a raw synthesis gas comprising CO, hydrogen, carbon monoxide, and water. The predicted outlet conditions of the gasifier are 1260° C. and 45 bara. The $H_2O:CO$ molar ratio of the raw syngas is predicted to be 0.51:1. The $H_2:CO$ molar ratio is predicted to be 0.77:1. The $CO_2:CO$ molar ratio of the raw syngas is predicted to be 0.37:1.

The following terms are used in Examples 1-16

Diluent Ratio=molar ratio of diluent to slag-free raw syngas $\Delta H_{GC}$=sensible heat removed from raw syngas in gas cooling zone $T_{GCin}$=temperature of raw syngas at inlet of gas cooling zone $T_{GCout}$=temperature of cooled syngas at outlet of gas cooling zone $T_{Quench}$=temperature of humidified gas at outlet of quench zone $T_D$=temperature of diluent Quench Ratio=molar ratio of quench water to slag-free raw syngas Examples 1-5

Examples 1-5 illustrate the effect of varying the diluent flow on the H2O:CO ratio of the humidified syngas when the diluent is water. For examples 1-5, water diluent is combined with the raw syngas and subjected to heat exchange in a gas cooler, and quenched with water to produce a humidified syngas. The gas cooler is designed to remove 7542 BTU/lbmol/hr sensible heat from the syngas at a diluent to raw syngas molar ratio of 0.074:1. The molar ratio of the sum of the quench water flow and water diluent flow to that of the raw syngas is held constant at 2.07:1. The quench water and water diluent temperatures are assumed to be 27° C. less than the calculated quench temperature in all cases. The ratio of molar flow rate of the water diluent to raw syngas is varied from 0:1 to 0.30:1. The results of heat and material balance calculations are summarized in Table 1:

TABLE 1

Effect of Diluent Ratio on Humid Gas $H_2O:CO$ Molar Ratio

|  | Diluent Ratio | $\Delta H_{GC}$ KJ/Kgmol/hr | $T_{GCin}$ Celcius | $T_{GCout}$ Celcius | Humid Gas $H_2O:CO$ Molar Ratio | $T_{Quench}$ Celcius |
|---|---|---|---|---|---|---|
| Example 1 | 0:1 | 20601 | 1260 | 728.8 | 1.56 | 204.4 |
| Example 2 | 0.037:1 | 18023 | 1187.8 | 715.7 | 1.69 | 206.8 |
| Example 3 | 0.074:1 | 17528 | 1121.6 | 697.8 | 1.80 | 208.6 |
| Example 4 | 0.15:1 | 14456 | 1004.2 | 675.7 | 2.05 | 212.3 |
| Example 5 | 0.30:1 | 9952 | 814.4 | 611.0 | 2.43 | 217.0 |

Examples 6-8

Examples 6-8 illustrate the effect of varying the diluent temperature on the $H_2O:CO$ ratio of the humidified syngas when the diluent is water. For Examples 6-8, water diluent is combined with the raw syngas and subjected to heat exchange in a gas cooler, and quenched with water to produce a humidified syngas. The molar ratio of the sum of the quench water flow and water diluent flow to that of the raw syngas is held constant at 2.07:1. The temperature of the quench water is assumed to be 27° C. less than the calculated quench temperature in all cases. The results of heat and material balance calculations are summarized in Table 2, with Example 4 for comparison.

TABLE 2

Effect of Diluent Temperature on Humid Gas $H_2O:CO$ Molar Ratio.

|  | Diluent Ratio | $T_D$ Celcius | $\Delta H_{GC}$ KJ/Kgmol/hr | $T_{GCin}$ Celcius | $T_{GCout}$ Celcius | Humid Gas $H_2O:CO$ Molar Ratio | $T_{Quench}$ Celcius |
|---|---|---|---|---|---|---|---|
| Example 4 | 0.15:1 | 189.9 | 14456 | 1004.2 | 675.7 | 2.05 | 212.3 |
| Example 6 | 0.15:1 | 35 | 14188 | 982.3 | 658.3 | 1.99 | 211.5 |
| Example 7 | 0.15:1 | 220 | 14481 | 1009.4 | 680.6 | 2.06 | 212.5 |
| Example 8 | 0.17:1 | 35 | 13363 | 952.9 | 652.3 | 2.05 | 212.3 |

Examples 9-13

Examples 9-13 illustrate control of the $H_2O:CO$ ratio of the humidified syngas by varying the quench water flow rate. Although not as effective as varying diluent flow, varying the quench water has an impact on the $H_2O:CO$ ratio of the humidified syngas. For examples 9-13, the raw syngas is subjected to heat exchange in a gas cooler, and quenched with water to produce a humidified syngas. The gas cooler is designed to remove 8864 BTU/lbmol/hr sensible heat from the syngas with no added diluent. The molar ratio of the quench water flow to that of the raw syngas is varied between 2.15:1 to 0.50:1. The quench water temperatures are assumed to be 27° C. less than the calculated quench temperature in all cases. The results of heat and material balance calculations are summarized in Table 3.

TABLE 3

Effect of Quench Water Flow Rate on Humid Gas $H_2O:CO$ Molar Ratio.

| | Diluent Ratio | Quench Ratio | % Quench Water Vaporized | Humid Gas $H_2O:CO$ Molar Ratio | $T_{Quench}$ Celcius |
|---|---|---|---|---|---|
| Example 1 | 0:1 | 2.15 | 17.8% | 1.56 | 204.4 |
| Example 9 | 0:1 | 1.96 | 20.1% | 1.59 | 205.0 |
| Example 10 | 0:1 | 1.77 | 23.0% | 1.63 | 205.7 |
| Example 11 | 0:1 | 1.40 | 30.6% | 1.69 | 206.8 |
| Example 12 | 0:1 | 1.00 | 41.9% | 1.75 | 207.7 |
| Example 13 | 0:1 | 0.50 | 90.1% | 1.84 | 209.2 |

Examples 14-16

Examples 14-16 illustrate the effect of varying the diluent flow on the $H_2O:CO$ ratio of the humidified syngas when the diluent is recycled humidified syngas. For examples 14-16, recycled humidified syngas ($H_2O:CO$ molar is identical to that of outlet humidified gas) is combined with the raw syngas and subjected to heat exchange in a gas cooler, and quenched with water to produce a humidified syngas. The gas cooler is designed to remove 8864 BTU/lbmol/hr sensible heat from the syngas at a diluent to raw syngas molar ratio of 0:1. The molar ratio of the quench water flow to that of the raw syngas is held constant at 2.07:1. The quench water temperatures are assumed to be 27° C. less than the calculated quench temperature in all cases. The diluent gas temperatures are assumed to be equal to the quench temperature in all cases. The ratio of molar flow rate of the diluent syngas to raw syngas is varied from 0:1 to 1:1. The results of heat and material balance calculations are summarized in Table 4.

TABLE 4

Effect of Gas Diluent Flow on Humid Gas $H_2O:CO$ Molar Ratio.

| | Diluent Ratio | $T_D$ Celcius | $\Delta H_{GC}$ KJ/Kgmol/hr | $T_{GCin}$ Celcius | $T_{GCout}$ Celcius | Humid Gas $H_2O:CO$ Molar Ratio | $T_{Quench}$ Celcius |
|---|---|---|---|---|---|---|---|
| Example 1 | 0.0:1 | — | 20601 | 1260 | 728.8 | 1.56 | 204.4 |
| Example 14 | 0.2:1 | 211.4 | 15285 | 1025 | 728.7 | 2.00 | 211.4 |
| Example 15 | 0.4:1 | 216.1 | 10814 | 884.0 | 684.9 | 2.35 | 216.1 |
| Example 16 | 1.0:1 | 222.4 | 4281 | 588.2 | 549.0 | 3.02 | 222.4 |

I claim:

1. A process for humidifying syngas comprising:
   (a) reacting a carbonaceous material with oxygen, water, or carbon dioxide to produce a raw syngas stream comprising hydrogen, carbon monoxide, and carbon dioxide;
   (b) combining said raw syngas stream of step (a) with a diluent to produce a diluted syngas stream comprising about 10 to about 60 moles of said diluent per 100 moles of said raw syngas stream;
   (c) passing said diluted syngas stream of step (b) to a radiant heat exchanger to produce a cooled syngas stream; and
   (d) contacting said cooled syngas stream of step (c) with liquid water to produce a humidified syngas stream;
   wherein the amount of said diluent combined with said raw syngas stream in step (b) is chosen to give an $H_2O:CO$ molar ratio of about 1:1 to about 3:1 in said humidified syngas stream of step (d) and said $H_2O:CO$ molar ratio varies in response to a downstream syngas requirement.

2. The process according to claim 1 wherein said carbonaceous material comprises methane, petroleum residuum, coal, coke, lignite, oil shale, oil sands, peat, biomass, petroleum refining residues, petroleum cokes, asphalts, vacuum resid, heavy oils, or combinations thereof.

3. The process according to claim 2 wherein said carbonaceous material of step (a) is reacted in a gasifier, partial oxidizer, or reformer.

4. The process according to claim 3 wherein said carbonaceous material comprises methane and is reacted with water in a reformer.

5. The process according to claim 3 wherein said carbonaceous material comprises coal or petroleum coke and is reacted with oxygen in a gasifier.

6. The process according to claim 1 wherein said diluent of step (b) comprises water, methane, ethane, propane, butane, recycled syngas, nitrogen, argon, helium, carbon dioxide, waste gases, combustion stack gases, or combinations thereof.

7. The process according to claim 6 wherein said diluent comprises water.

8. The process according to claim 1 wherein the amount and/or temperature of said diluent in step (b) combined with said raw syngas stream varies in response to a downstream syngas requirement.

9. The process according to claim 1 further comprising generating steam in step (c).

10. The process according to claim 9 wherein the pressure of said steam generated in step (c) varies in response to a downstream syngas requirement.

11. The process according to claim 1 wherein said raw syngas in step (a) has a temperature of about 1000 to about 2000° C.

12. The process according to claim 1 wherein the temperature of said diluent is lower than the temperature of said raw syngas stream.

13. The process according to claim 1 wherein step (d) is carried in a water quench system having influent and effluent flows of water.

14. The process according to claim 13 wherein the amount of said influent and/or effluent flows of water vary in response to a downstream syngas requirement.

15. The process according to claim 8 wherein said downstream syngas requirement comprises a feedstock requirement for a chemical process, a fuel requirement for a power producing process, or a combination thereof.

16. The process according to claim 15 wherein said chemical process comprises a process for methanol, alkyl formates, dimethyl ether, oxo aldehydes, ammonia, methane, hydrogen, Fischer-Topsch products, or a combination thereof.

17. The process according to claim 16 wherein said chemical process comprises a water-gas shift process, a methanol process, or a combination thereof.

18. The process according to claim 15 wherein said power producing process comprises a combined cycle system.

19. The process according to claim 1 further comprising passing up to 100 volume percent of said humidified syngas from step (d) to a water-gas shift reactor to produce a shifted syngas stream comprising additional hydrogen and carbon dioxide.

20. The process according to claim 19 further comprising passing up to 100 volume percent of said shifted syngas stream to a chemical process to produce methanol, alkyl formates, dimethyl ether, oxo aldehydes, ammonia, methane, Fischer-Topsch products, or a combination thereof.

21. The process according the claim 20 wherein the amount of said diluent in step (b) combined with said raw syngas stream is chosen in response to a syngas feedstock requirement for said chemical process.

\* \* \* \* \*